United States Patent
Collins et al.

(10) Patent No.: US 12,130,232 B2
(45) Date of Patent: Oct. 29, 2024

(54) SYSTEM AND METHOD FOR MOBILE DEVICE PHOSPHOR EXCITATION AND DETECTION

(71) Applicant: INTELLIGENT MATERIAL SOLUTIONS, INC., Princeton, NJ (US)

(72) Inventors: Joshua E. Collins, Wallingford, PA (US); Howard Y. Bell, Princeton, NJ (US)

(73) Assignee: INTELLIGENT MATERIAL SOLUTIONS, INC., Princeton, NJ (US)

( * ) Notice: Subject to any disclaimer, the term of this patent is extended or adjusted under 35 U.S.C. 154(b) by 458 days.

(21) Appl. No.: 17/420,854

(22) PCT Filed: Jan. 7, 2020

(86) PCT No.: PCT/US2020/012520
§ 371 (c)(1),
(2) Date: Jul. 6, 2021

(87) PCT Pub. No.: WO2020/146335
PCT Pub. Date: Jul. 16, 2020

(65) Prior Publication Data
US 2022/0082502 A1    Mar. 17, 2022

Related U.S. Application Data

(60) Provisional application No. 62/789,100, filed on Jan. 7, 2019, provisional application No. 62/904,111, filed on Sep. 23, 2019.

(51) Int. Cl.
G01N 21/64    (2006.01)
G07D 7/0043    (2016.01)
(Continued)

(52) U.S. Cl.
CPC ....... G01N 21/6447 (2013.01); G07D 7/0043 (2017.05); G07D 7/1205 (2017.05);
(Continued)

(58) Field of Classification Search
CPC ....... G01N 21/6447; G01N 2201/0221; G01N 2201/06113; G01N 2021/7759;
(Continued)

(56) References Cited

U.S. PATENT DOCUMENTS 7,899,093 B1    3/2011 Bass et al.
8,822,954 B2    9/2014 Li et al.
(Continued)

FOREIGN PATENT DOCUMENTS

CN    102197262 A    9/2011
CN    104272139 A    1/2015
(Continued)

OTHER PUBLICATIONS

International Search and Written Opinion for corresponding PCT Application No. PCT/US2020/012520, dated Mar. 23, 2020.
(Continued)

*Primary Examiner* — Edwin C Gunberg
*Assistant Examiner* — Gisselle M Gutierrez
(74) *Attorney, Agent, or Firm* — MEAGHER EMANUEL LAKS GOLDBERG & LIAO, LLP

(57) ABSTRACT

The present disclosure is drawn to a method and system for the excitation, identification, and authentication of light emitting materials using a mobile device comprising at least one Vertical Cavity Surface Emitting Laser (VCSEL), for use in a variety of applications.

27 Claims, 7 Drawing Sheets

(51) Int. Cl.
*G07D 7/1205* (2016.01)
*G07D 7/121* (2016.01)

(52) U.S. Cl.
CPC ..... *G07D 7/121* (2013.01); *G01N 2201/0221* (2013.01); *G01N 2201/06113* (2013.01)

(58) Field of Classification Search
CPC .............. G01N 2021/7786; G01N 2021/6497; G01N 2201/0612; G01N 21/64; G07D 7/0043; G07D 7/1205; G07D 7/121; G07D 7/12; G07D 7/202
See application file for complete search history.

(56) References Cited

U.S. PATENT DOCUMENTS

| | | | |
|---|---|---|---|
| 9,665,815 B2 | 5/2017 | Collins et al. | |
| 9,699,391 B2 | 7/2017 | McCloskey et al. | |
| 10,710,395 B2 | 7/2020 | Hussain et al. | |
| 2007/0116918 A1 | 5/2007 | Belov et al. | |
| 2011/0025190 A1* | 2/2011 | Jagt | H01L 33/58 313/499 |
| 2012/0280144 A1 | 8/2012 | Guilfoyal et al. | |
| 2013/0135081 A1* | 5/2013 | McCloskey | A63F 13/213 340/5.8 |
| 2014/0233095 A1* | 8/2014 | Lee | G01N 21/6458 359/385 |
| 2014/0362228 A1* | 12/2014 | McCloskey | G01N 21/6456 348/164 |
| 2015/0103634 A1* | 4/2015 | In | G04D 7/00 368/10 |
| 2017/0358163 A1 | 12/2017 | Clara et al. | |
| 2018/0046834 A1 | 2/2018 | Langerman | |

FOREIGN PATENT DOCUMENTS

| | | | | |
|---|---|---|---|---|
| CN | 105518437 A | | 4/2016 | |
| EP | 3321649 A1 | | 5/2020 | |
| JP | 2009205057 | * | 9/2009 | ............. G02B 27/20 |
| KR | 20150107944 A | | 9/2015 | |
| WO | 20140207415 A1 | | 12/2014 | |
| WO | 2019072492 A1 | | 4/2019 | |

OTHER PUBLICATIONS

Osram, 'VCSELs enabelig progress in biometric applications such as mobile 3D sensing, Article (online), Nov. 28, 2018.
First Office Action and Search Report for corresponding Chinese Application No. 2020800081657, dated Apr. 19, 2024.
Supplemental European Search Report for corresponding EP Application No. 20738440, dated Oct. 26, 2022.

* cited by examiner

SYSTEM AND METHOD FOR MOBILE DEVICE PHOSPHOR EXCITATION AND DETECTION

CROSS-REFERENCE TO RELATED APPLICATIONS

This application claims priority to U.S. Provisional Application Nos. 62/789,100, filed Jan. 7, 2019, and 62/904,111, filed Sep. 23, 2019, both of which are herein incorporated by reference in their entirety.

FIELD OF THE INVENTION

The present invention relates to a method and system for identification of light emitting materials using a mobile device that comprises at least one Vertical Cavity Surface Emitting Laser (VCSEL).

BACKGROUND

Advances in laser technology, and VCSELs in particular, have evolved novel uses in consumer electronics, most recently in mobile devices for facial recognition and home gaming platforms such as X-Box Kinect. The driving technology application warranting the integration of near infrared VCSELs into mass market consumer devices was facial and iris (or ocular) recognition platforms originally developed for the defense industry. The rapid growth of the smart device/mobile phone industry has driven competition, advancing the development and integration of these technologies across platforms with the primary use being around facial recognition (FR).

As the number new users of smart devices continues to grow with mobile phone users passing five billion by 2019 (nearly 67% of the world's population), new applications are emerging increasing the interactions between smart devices and the user's surrounding environment providing various information to the user and merchants. The adoption of 2D barcode recognition by the mobile smart device industry is an example of how smart devices are beginning to be widely adapted to better utilize the built-in technology capabilities of current smart devices. It is therefore conceivable that everyday products can be embedded with optical reporters capable of interacting with commercially available smart devices to provide even more information, and more secure information, to the consumer than would be typically available or easily faked or counterfeited in a more conventional 1D or 2D barcode.

There several other evolving areas of use for VCSELs including immersive augmented reality, high speed data transmission, and other low sensitivity light applications such as low light therapy.

BRIEF SUMMARY

A first aspect of the present disclosure is drawn to a system for exciting one or more phosphors (e.g., upconverting phosphors and downconverting phosphors), such as those on or in a substrate, utilizing a relatively low-power infrared (IR) VCSEL that is part of a mobile device (including smartphones, wearables such as smart glasses, and custom-built portable systems), such that photons emitted from the phosphors are detectable by the human eye, the mobile device, or both.

In some embodiments, the IR VCSEL emits a wavelength with a peak in the range of between 780 and 11000 nm. In some preferred embodiments, the distance between the IR VCSEL and the phosphor(s) (sometimes referred to as a predetermined maximum distance) is shorter than the minimum focal distance of a camera located on the mobile device. In some embodiments, the length of the predetermined maximum distance is less than about 3 inches. Optionally, this distance is less than about 2 inches. Optionally, this distance is less than about 1 inch.

Optionally, the substrate may be a polymeric material, a conductive metal, an insulator, a semiconductor, leather, wood, glass, ceramic, natural or synthetic fiber, or some combination thereof. Optionally, the phosphors may be on or within a toy, part of a toy, a banknote, a security document, a label, an article of clothing, a fashion accessory, or a diagnostic strip.

In some embodiments, such as where the phosphor is on or within a toy or a component of a toy, the toy or component of a toy can be comprised of a translucent or transparent material, such that when the phosphor(s) are excited by the light emitted by the IR VCSEL, substantially all of the toy or component of a toy will glow with a visible light.

Optionally, a lens may be positioned between the mobile device and the phosphor, where the light emitted from the VCSEL is directed towards the lens, and the lens concentrates the light down towards the phosphor(s).

In embodiments, where the system includes a sensor, the sensor may be configured to detect an optical response from the phosphor. Optionally, the sensor may be a front-facing camera or a rear-facing camera. Optionally, the sensor is may be a semiconductor detector.

In some embodiments, the sensor may be configured to detect a signal in various ways, including either while the VCSEL is emitting, after the VCSEL has stopped emitting, or both. In some embodiments, the sensor is configured to detect light from the phosphor of about the same wavelength as the light emitted by the VCSEL, while in other embodiments, the sensor is configured to detect light at a lower wavelength than that emitted by the VCSEL.

Optionally, the system may be configured to loop through a series of steps multiple times, where the steps include (a) turning on the VCSEL, (b) turning off the VCSEL, (c) detecting a signal, and repeating.

Optionally, after detecting a response from the phosphors, the system may be configured so the mobile device emits one wavelength when the response matches an expected response, and optionally emits a second wavelength when the response does not match an expected response. If the substrate contains a red and green phosphor, for example, the mobile device can emit a light that excites the green phosphors when the response matches, and can emit a light that excites the red phosphors when the response does not match.

Optionally, the phosphors are arranged in a way such that the mobile device can detect and read a barcode, an image, or both. In some embodiments, the barcode and/or image provides information to the mobile device. If that information is a network (intranet, internet, etc.) address, the mobile device can be configured to open a website or file located at the address. In some embodiments, the barcode or image is on a component of a separate device or system (e.g., the image is on a replacement belt for an automobile engine) and the barcode or image contains information about that component (e.g., a part number, etc.). When the mobile device excites the phosphor(s), and decodes the barcode or image, the mobile device then displays information about the positioning of the component within the separate device or system.

A second aspect of the present disclosure is drawn to a method for authentication using phosphors. The method includes initializing an application on a smart device that can control a VCSEL light source, activating the VCSEL to irradiate a substrate comprising at least one phosphor, detecting an optical response to the VCSEL irradiation, and determining if the optical response matches an expected response.

Optionally, the substrate may contain phosphors with different compositions. Optionally, the determination step involves detecting a signal with a sensor and extracting data from the detected signal. Optionally, the extracted data may include one or more characteristics such as brightness, bit depth, luminance, color, color space, intensity/luminosity, hue, tint, saturation, shade, tone, lightness, chromatic signal, and grayscale, or the time dependence of one or more of those characteristics.

Optionally, the method may also involve verifying an optical signature of the at least one phosphor, verifying an identity of a user, or both. In some embodiments, the method goes on to send at least some of the extracted data and (a) the verification of an optical signature of the at least one phosphor, (b) the verification of an identity of the user, or (c) a combination of both (a) and (b), to a data storage.

A third aspect of the present disclosure is drawn to at least one non-transitory computer-readable memory carrying instructions to be executed by at least one processor. The instructions are to perform a method for authentication using phosphors, involving (a) receiving input from a user (e.g., clicking a "Start" button), (b) based on that input from the user, activating a VCSEL light source in a way that it emits at least one wavelength of light sufficient energy to excite at least one up-converting phosphor positioned at a predetermined maximum distance between the VCSEL light source and the at least one upconverting phosphor.

Optionally, the memory also includes instructions for receiving a signal from the at least one phosphor, extracting data from the received signal, and comparing the extracted data to an expected response.

DETAILED DESCRIPTION

As used herein, "Mobile Device" means any electronic device capable of being carried by a human being. This includes mobile phones, tablets, laptops, and wearables such as watches and glasses. While many mobile devices utilize an operating system, such is not required. Mobile Devices also includes custom-built devices, such as a device similar to a hand-held flashlight, but containing at least a VCSEL and a sensor for detecting responses. Mobile Devices may or may not have a display screen. Mobile Devices may or may not have network access.

As used herein, "Phosphors" means any material that emits light via phosphorescence when illuminated with a wavelength of light that the material is capable of absorbing. Typically, the phosphors will include rare-earth compounds (the fifteen lanthanides, plus scandium and yttrium). Phosphors include upconverting phosphors (UCPs) and down-converting phosphors (DCPs). UCPs utilize an anti-Stokes type emission, wherein the absorption of two or more photons leads to the emission of light at shorter wavelength than the excitation wavelength. DCPs, on the other hand, absorb one photon and emit at a longer wavelength than the excitation wavelength. Some preferred phosphor compositions are those that contain the rare earth ion Ytterbium as a dopant.

As used herein, "Substrate" means any non-phosphor material that a phosphor can be placed on or within. In some embodiments, the substrate may be a polymeric material, a conductive metal, an insulator, a semiconductor, leather, wood, glass, ceramic, natural or synthetic fiber, or some combination thereof. The substrate may be a product or component of a product. For example, the substrate may form some or all of a toy, a component or part of a toy, a banknote, a security document, a label, an article of clothing, a fashion accessory (including, e.g., glasses, jewelry, handbags, gloves, watches, scarves, socks, umbrellas, stockings, belts, and ties), or a diagnostic strip (e.g., a test strip for a disease or condition). In some embodiments, the substrate is opaque, while in others the substrate may be translucent or transparent.

Figure 1A:
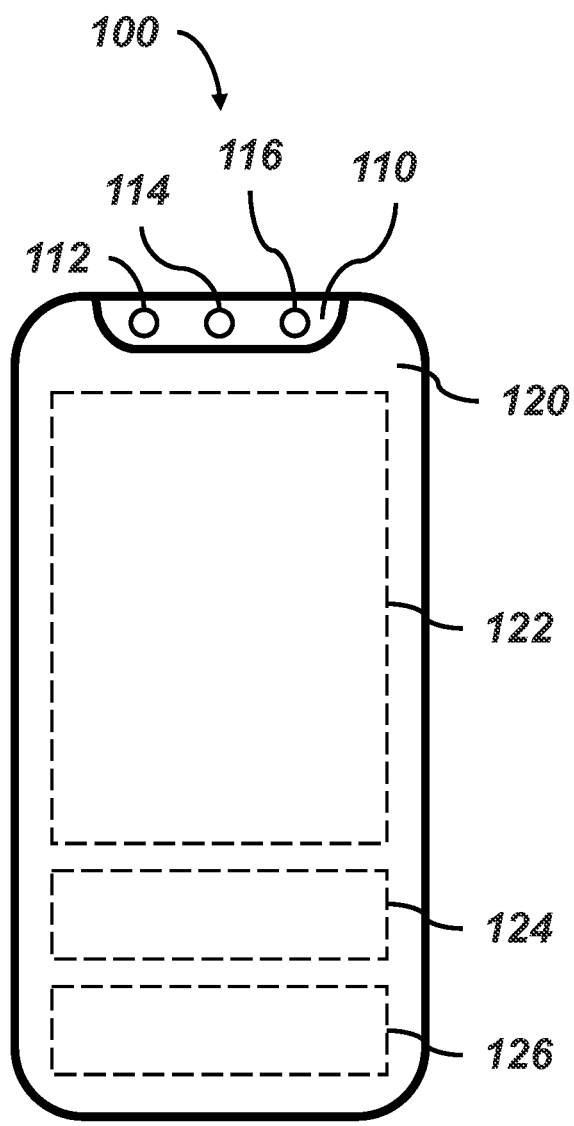
FIG. 1A is a graphic depiction of a mobile device that can be used within an embodiment of the disclosed system.
Figure 1B:
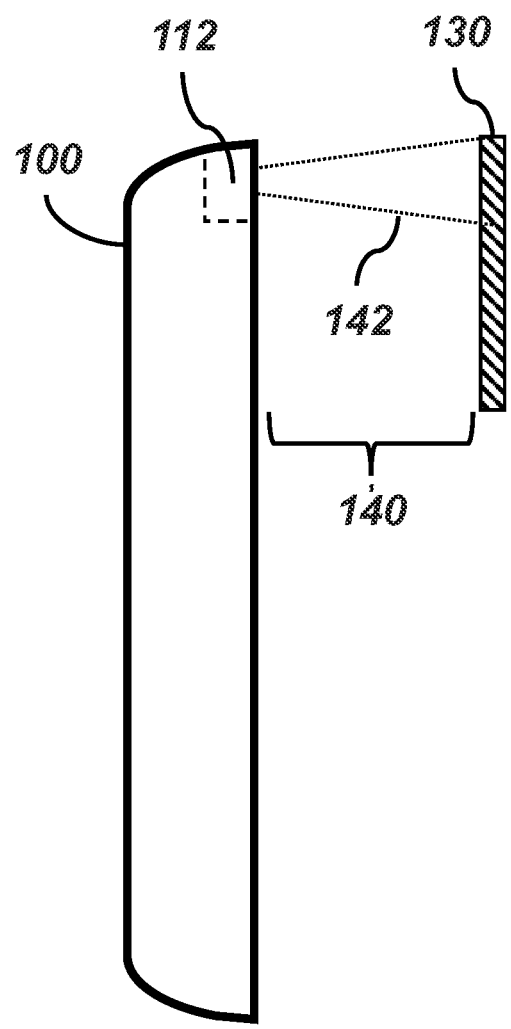
FIGS. 1B and 1C are graphic depictions of a side view of a mobile device practicing a portion of the disclosed method.
Figure 1C:
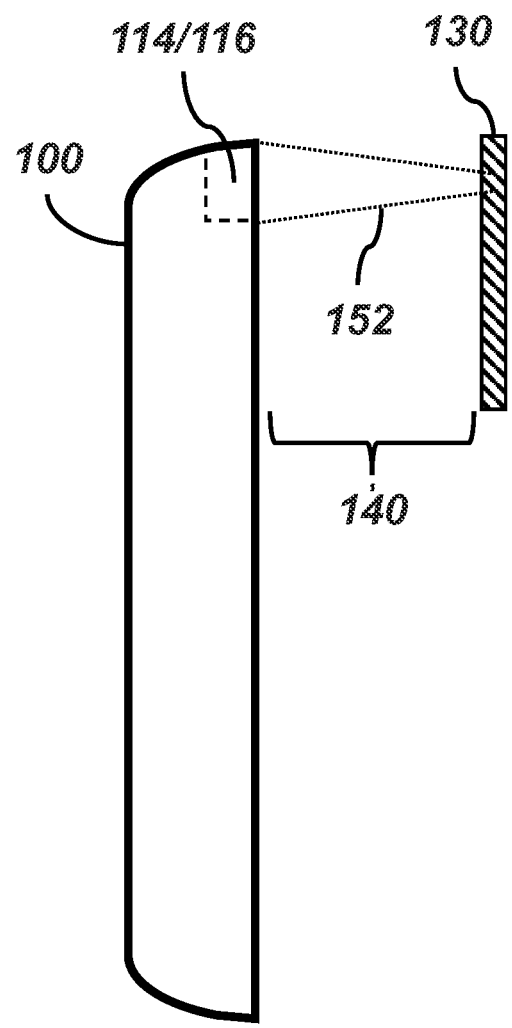

A first aspect disclosed in the present disclosure can be best understood in reference to FIGS. 1A-1C. In preferred embodiments, VCSELs and camera sensors (visible and NIR), such as those used for facial recognition will be controlled via application software to appropriately activate the VCSEL in order to excite phosphor(s) embedded or attached to a substrate of an item or product, and then detect those phosphor(s).

As shown in FIG. 1A, the system generally involves a mobile device (100) that contains a relatively low-power infrared (IR) VCSEL (112), as eye-safe VCSELs generally have output powers less than 10 microwatts at near infrared (NIR) wavelengths. In some embodiments, the VCSEL emits a wavelength with a peak in the infrared region (roughly 780 nm to 1000 µm). In some embodiments, the VCSEL emits a wavelength with a peak in the near infrared (NIR) region (roughly 780 nm to 3000 nm). In some embodiments, the VCSEL emits a wavelength with a peak in the mid infrared (MIR) region (roughly 3000 nm to 50,000 nm). In some embodiments, the VCSEL emits a wavelength with a peak in the range of between 780 and 11,000 nm. In some preferred embodiments, the VCSEL emits a wavelength with a peak in the range of between 780 and 1000 nm.

The mobile device (100) may contain one or more sensors (114, 116), which may be configured to detect an optical response from a phosphor. The mobile device (100) may utilize a first set of circuitry (110) for controlling the VCSEL (112). In some embodiments, the first set of circuitry (110) may also control the one or more sensors (114, 116). In FIG. 1A, the mobile device is shown to have a camera as a first sensor (114), which is depicted as a front-facing camera, but the mobile device may use a front facing camera, a rear facing camera, and/or both. In FIG. 1A, the mobile device also has a second sensor (116), which may be a semiconductor sensor, such as an avalanche photodiode.

Referring to FIGS. 1B and 1C, the mobile device (100) or substrate (130) can be moved so that the VCSEL (112) is within a predetermined maximum distance (140) from one or more phosphor(s) (not shown) that are on or in the substrate (130). In some embodiments, the phosphor(s) used are a single phosphor composition. In some embodiments, two different compositions of phosphors are used. In some embodiments, three different compositions of phosphors are used. In some embodiments, at least two different compositions of phosphors are used.

The VCSEL can emit at least one wavelength of light (142) to excite the phosphor(s) with sufficient energy that photons emitted by the phosphor(s) (152) are detectable by (a) a human eye, (b) one of the sensors (114, 116), or (c) both (a) and (b).

The phosphors can be incorporated into or onto to an item or product via many conventional approaches such as ink-based printing methods, extrusion, or coatings (including powder coatings). Incorporation into 3-D printing resins and molded plastics for part manufacturing. Upconverting taggants have been functionalized using poly-acrylic acid surface ligands and blended into commercially available UV-curable, 3-D printing resins.

In some embodiments, the labelled component must contain a sufficient concentration of upconverting phosphors to allow a human eye to detect the optical response of the phosphors when illuminated by an eye-safe VCSEL from a distance of 3 cm or less. Typically, in order to achieve reliable detection of the upconverting phosphors using the TOF-VCSEL sensor on, e.g., current mobile devices such as the iPhone X and 11, the upconverting phosphors must be typically blended at a concentration greater than 1% loading in the curable resin for opaque substrates. In some embodiments, the concentration is between 1% and 5% in the curable resin. In some embodiments, the concentration is between 1% and 4% in the curable resin. In some embodiments, the concentration is between 1% and 3% in the curable resin. In some embodiments, the concentration is between 1% and 2% in the curable resin. With opaque substrates, the optical response of the phosphors can only be seen by the human eye on the same side of the component that is being illuminated. With translucent or transparent substrates (including otherwise opaque substrates that are sufficiently thin so as to allow the transmission of the optical response through the substrate), a lower concentration may be used. Translucent substrates may utilize concentrations between 0.5 and 1%, while transparent substrates may utilize concentrations between 0.1% and 1%, including 0.1% and 0.5%.

The phosphors can be used as consumer-level security features embedded in the product itself as well as in the product packaging and labels. The phosphors can also be applied to transaction and identification cards as authentication and security features capable of detection utilizing commercially available mobile devices. Incorporation into various inks including but not limited to inkjet, silk-screen and offset inks. Phosphors can be modified to have various surface functionalities enabling stable suspensions in a variety of inks such as inkjet, offset, silk-screen, and pad inks. Additionally, other optically active components can be introduced into the inks that can be activated by the upconverting phosphors thus increasing the complexity of the optical signature being measured. In preferred embodiments, in order to be effectively analyzed the phosphors must be loaded at a high enough of a concentration to allow for sufficient light output that can be detected using the CMOS camera on current mobile devices.

In some embodiments the phosphor is coated in a silkscreen ink onto clear polyvinyl chloride (PVC), polyethylene terephthalate (PET), or other substrate and providing a transparent label or hangtag for various merchandise and apparel. Another embodiment has the phosphor embedded in a label that is also designed with an embedded light pipe in the label itself. The light pipe in the label is configured to direct the VCSEL light towards the camera. The light pipe or waveguide is a detachable module that is designed to effectively concentrate and direct the light emitted from the VCSEL to the optimal focal distance of the embedded cameras and/or APD detectors in the smart device providing the most efficient light collection from the phosphors.

In some preferred embodiments, the distance between the VCSEL and the phosphor(s) (sometimes referred to as a predetermined maximum distance) is shorter than the minimum focal distance of a camera located on the mobile device. In some embodiments, the length of the predetermined maximum distance is less than about 3 inches. In some embodiments, this distance is less than about 2 inches. In some embodiments, this distance is less than about 1 inch.

In some embodiments, when the substrate forms some or all of a product or component, and preferably when the substrate is a toy or a component of a toy, the substrate may be comprised of translucent or transparent materials, such that when the phosphor(s) are excited by the light emitted by the IR VCSEL, substantially all of the toy or component of a toy will glow with a visible light.

In some embodiments, the mobile device may contain a display (120), such as a touch-sensitive screen. The display may have a user interface that may include, e.g., a first area (122) for displaying results (e.g., an "authenticated" or "positive test result" message, a captured image, or data/information relating to the substrate), a second area (124) for status messages, and a third area (126) can be used as a start/stop button. In some embodiments, the first area shows the image being captured by the camera.

Figure 2:
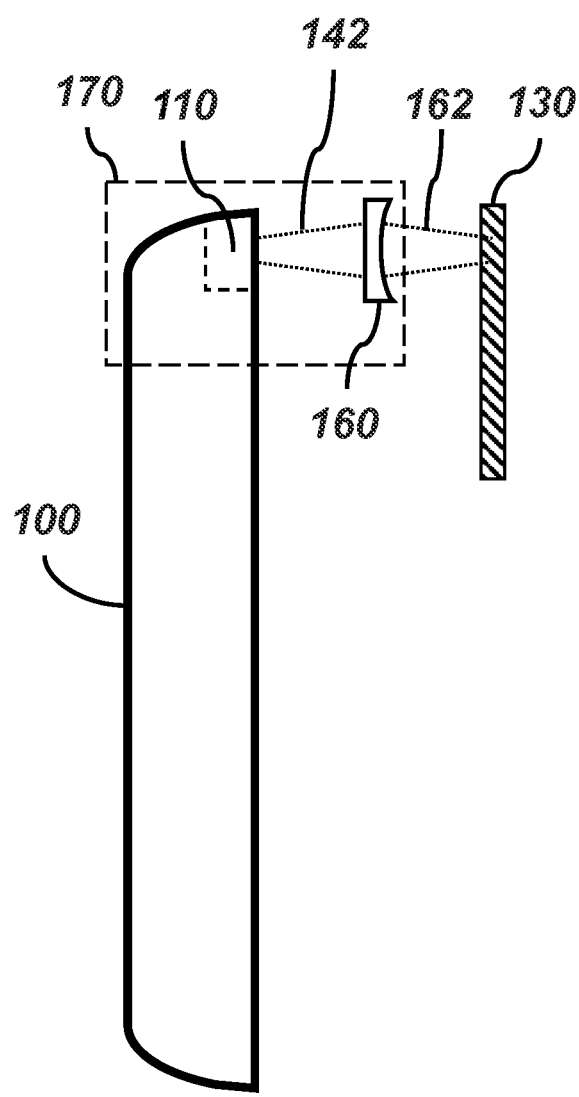
FIG. 2 is a graphic depiction of a side view of an embodiment of a disclosed system utilizing an additional lens.

Referring to FIG. 2, it can be seen that in some embodiments, a lens (160) may be positioned between the mobile device (110) and the phosphor (not shown) on the substrate (130), where the light emitted from the VCSEL (142) is directed towards the lens (160), and the lens (160) then concentrates (162) the light down towards the phosphor(s). In some embodiments, the lens (160) is part of the mobile device. In other embodiments, the lens (160) may be in a separate housing (170) that connects or attaches to the mobile device (100).

In some embodiments, various applications may require higher VCSEL power density and/or detector sensitivity. This might require, e.g., waveguide optics to enable directing and focusing of the VCSEL light projected into the field of view of the camera or separate detector such as an Avalanche Photodiode (APD) embedded in, e.g., detachable housing. In some embodiments, the system might use, e.g., detachable housing with collimating waveguide to direct and concentrate VCSEL laser light to field of view of infrared or visible camera on the front facing camera and/or an embedded APD.

Figure 3:
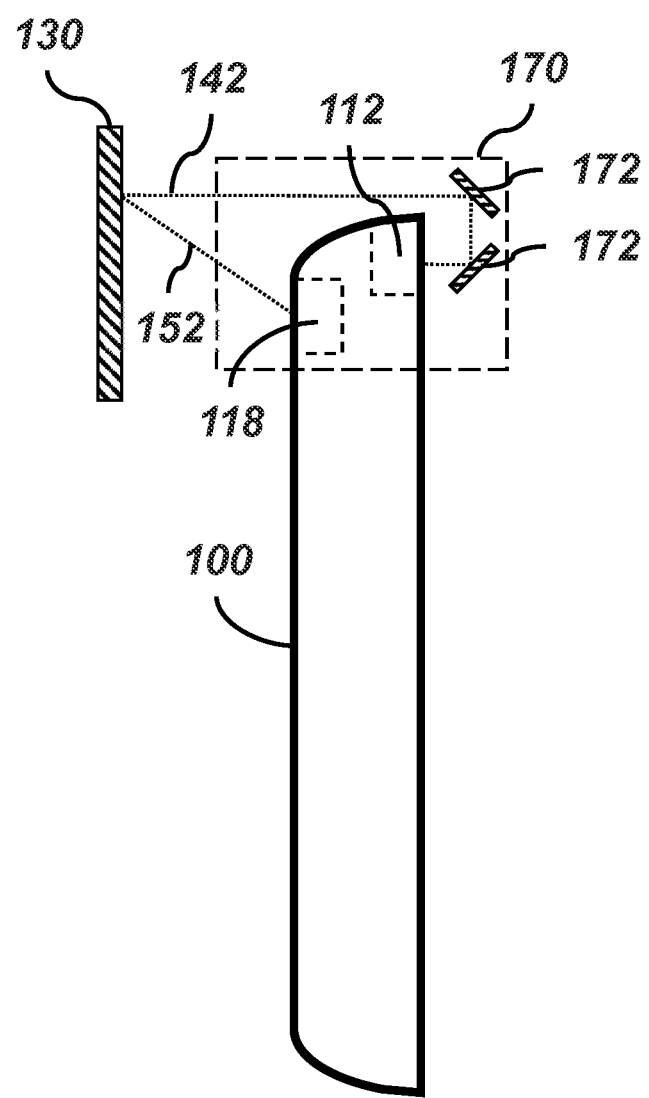
FIG. 3 is a graphic depiction of a side view of an embodiment of a disclosed system where the emitted light is redirected prior to reaching a substrate.

Referring to FIG. 3, it can be seen that in some embodiments, the light (142) emitted from the VCSEL (112) can be directed to excite phosphors on a substrate (130) where the substrate (130) is not in directly in front of the VCSEL (112). In some embodiments, a housing (170) may contain one or more reflective surfaces (172) to direct the light. In other embodiments, waveguides are used. In some embodiments, once the phosphors on the substrate (130) are excited, the photons emitted from the phosphors are detected by a sensor (118) that is oriented in a different direction than the VCSEL (112). For example, the sensor (118) may be oriented 180 degrees from the VCSEL (112). In other examples, the sensor (118) is connected to a surface on the opposite side of the mobile device (100) from the VCSEL (112). In still other examples, the sensor may be positioned on the same side of the mobile device as the VCSEL, but oriented at an angle that is less than 90 degrees difference from the orientation of the VCSEL.

Figure 4:
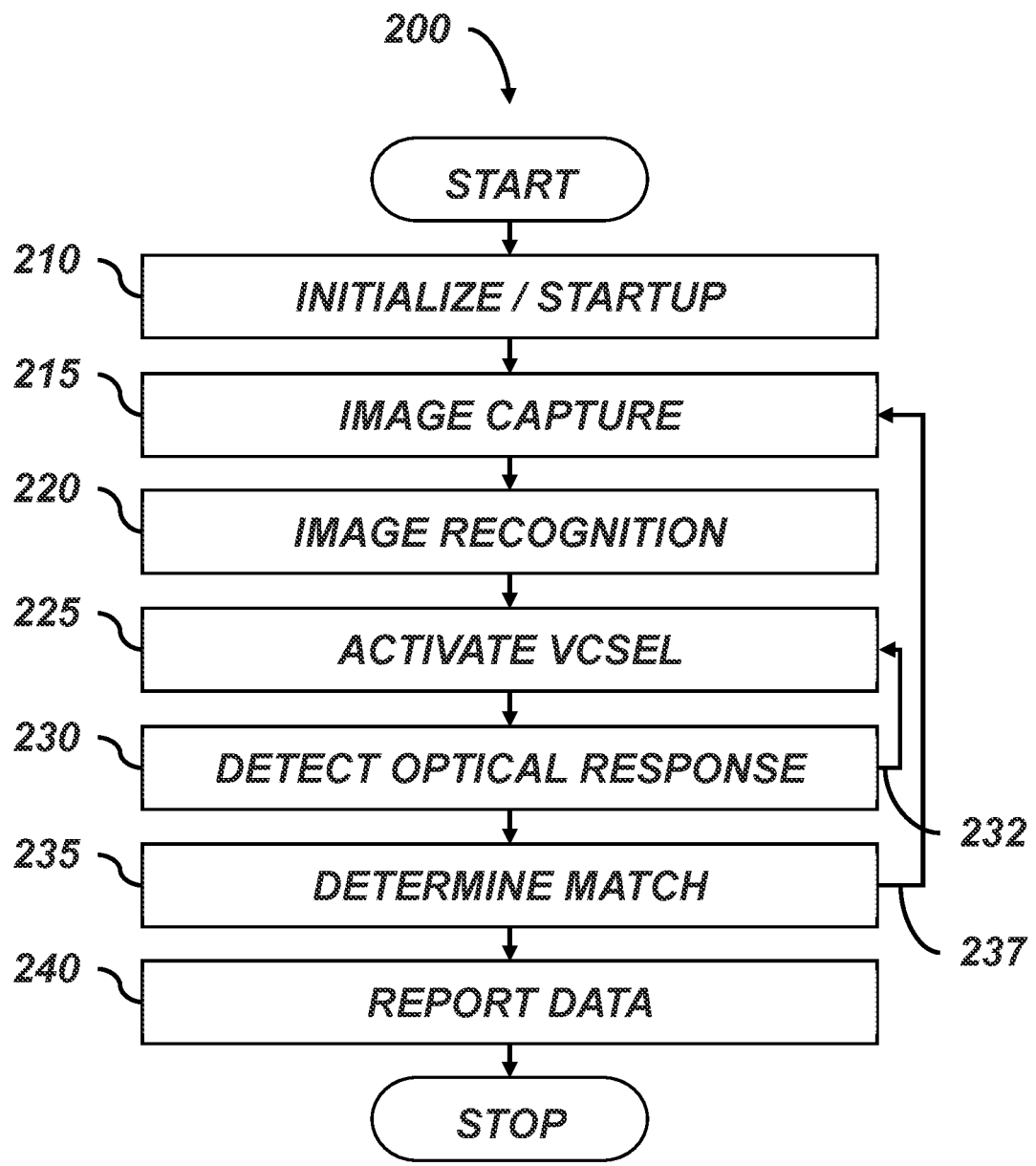
FIG. 4 is a flowchart describing an embodiment of a disclosed method.

Embodiments of the disclosed method can best be understood with reference to FIG. 4. The method (200) optionally begins by initializing or starting up the mobile device, or starting an application that runs on the operating system of the mobile device (210). This step may also involve user verification, which may include entering a password, verification via facial recognition, etc. This step may also include initializing cameras or sensors (e.g., visible and IR cameras or sensors), running the system through a calibration sequence (e.g., scanning one or more standards and ensuring the results fall within an expected response range), and/or storing information related to the calibration, which may include some or all of the following: date of the calibration, time of the calibration, username of the person calibrating, the results of the calibration, and/or some or all of the sensor data gathered during calibration.

In one embodiment of the disclosed method (200), the main portion of the method optionally begins with the alignment of the mobile device and the substrate that contains the phosphors, such that the a camera on the mobile device can capture an image of enough of the substrate (215) such that, using image recognition software, the substrate can be recognized and identified (220). In some embodiments, visually recognizable information on the substrate is captured as well via, e.g., optical character recognition. For example, in some embodiments, a user may first maneuver a driver's license in from of the device to allow the device to capture an image of the license. The system may then use known image recognition techniques to identify the image as a picture of a driver's license (as opposed to a passport, a school ID card, or a credit card). The system may also capture information from the driver's license, such as a name, driver's license number, date of birth, etc.

The disclosed methods may then activate the VCSEL (225), typically generating some response from the phosphor. The sensors then detect an optical response (230). Detecting the optical response may also involve capturing an image using, e.g., a NIR and/or visible light camera.

Figure 5:
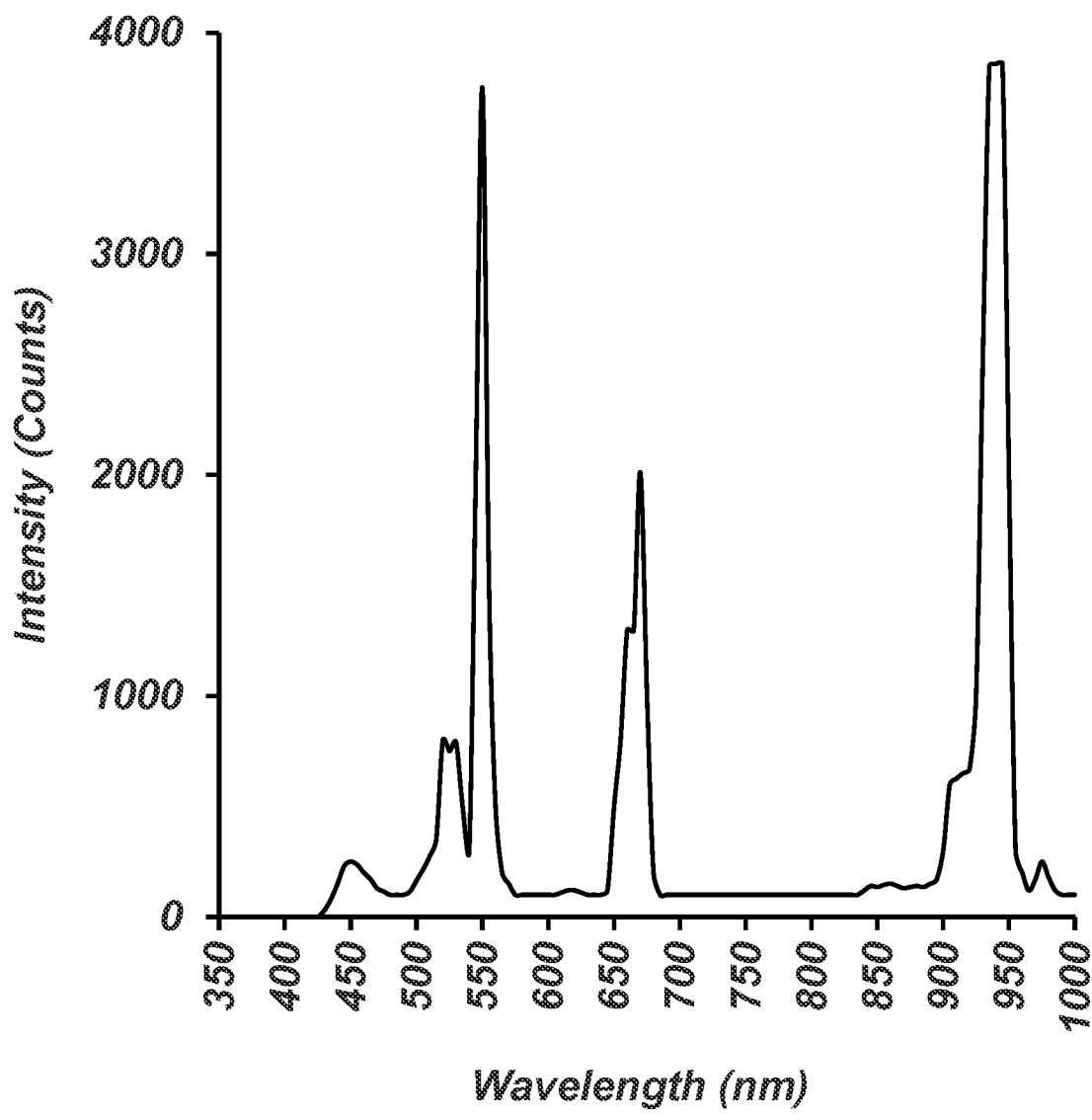
FIG. 5 is a graph depicting three measured emissions: a visible green emission (~540 nm) from a first type of phosphor, a visible red emission (~660 nm) from a second type of phosphor and the emission from the IR VCSEL (~936 nm).

A sample response detected by a sensor may be seen in reference to FIG. 5. There, it can be seen that the intensity of light detected by the sensor peaks at 3 different wavelengths: a visible green emission (~540 nm) from a first type of phosphor, a visible red emission (~660 nm) from a second type of phosphor and the emission from the IR VCSEL (~936 nm).

In some embodiments, the sensor may be configured to detect a signal in various ways, including either while the VCSEL is emitting, after the VCSEL has stopped emitting, or both. In some embodiments, the sensor is configured to detect light from the phosphor of about the same wavelength as the light emitted by the VCSEL, while in other embodiments, the sensor is configured to detect light at a lower wavelength than that emitted by the VCSEL.

In some embodiments, the system may be configured to loop through a pattern of activation and detection (232) multiple times. The steps generally include, in no particular order, (a) turning on the VCSEL, (b) turning off the VCSEL, (c) detecting a signal, and repeating. In some embodiments, this loop occurs at a fixed frequency while a button on the mobile device is depressed. For example, while a "Scan" button is being pressed, the system may run through the loop, detecting a signal 10 to 100 times per second. In some embodiments, this loop occurs at least a minimum number of times (for example, at least 10 scans being required in order to ensure enough data is collected to make an accurate prediction).

In some embodiments, the method continues by determining if the detected optical response matches an expected response (235). In some embodiments, this can be done without the mobile device—if the phosphors are expected to be arranged in a pattern that forms a red ball when the phosphors are illuminated, and the user instead sees a blue square, it is clear that there is no match.

In other embodiments, further work is required, however. For example, the system may then extract data from the detected optical response and verify the response matches an expected response. In some embodiments, the extracted data can be one or more of the following characteristics that may constitute some or all of an "optical signature" of the phosphor(s): brightness, bit depth, luminance, color, color space, intensity/luminosity, hue, peak wavelength(s), tint, saturation, shade, tone, lightness, chromatic signal, and/or grayscale, or the time dependence of one or more of those characteristics. This can include rise time, decay time, etc. For example, the system could measure the change in intensity of a response at a particular wavelength for 10 microseconds after the end of illumination by the VCSEL, and compare that to an expected curve. If the curves did not match within an expected margin of error, the "optical signature" of the phosphor(s) would not be verified. response would not be verified.

The system may then loop (237) back to a previous step, e.g., the image capture (215) step, and rescan the phosphor(s), or scan a different set of phosphors.

The method may optionally also store data related to the verification, either locally or remotely. If remotely stored, the system may comprise a wired or wireless communication interface to allow the information to be transmitted via an appropriate method. The data stored may involve storing some or all of the data captured for a given substrate, the date, the time, the location, the user involved, and/or the results. For example, the method may optionally include sending some or all the extracted data, a verification of the optical signature of the at least one phosphor, and/or a verification of the identity of the user to a data storage, such as a cloud-based server.

In many cases, the system may emit a sound, have an indicator light, or display some images or text to tell the user if the detected response matches an expected response. However, other approaches can be used that may be more useful in some situations. In systems where the substrate comprises two or more different compositions of phosphors, the system may be configured so the mobile device emits one wavelength when the response matches an expected response, and optionally emits a second wavelength when the response does not match an expected response. For example, a technician may use a mobile device to scan a parts drawer to find a needed part, and the outside of the parts are labelled with a mixture of red and green emitting phosphors. When the mobile device detects each part, the mobile device can emit a wavelength of light that excites the green phosphors but not the red when the response matches, and can emit a wavelength of light that excites the red phosphors but not the green when the response does not match. Thus, the technician would see the green or red light being emitted from a particular part, and would more easily be able to identify which part needs to be taken from the parts drawer.

Another aspect of the disclosed invention relates to an intelligent label design for recognition by mobile devices. The rapid evolution and proliferation of mobile devices has seen their role in the daily lives of consumers drastically increase and with the expansion of mobile 4G/5G and WiFi networks many commercial and government entities are embracing the integration of these devices and embedded technologies as a tool for product development, marketing, consumer feedback, and supply chain analysis. For instance, the integration of application software for reading 2-D barcodes has been widely adopted for applications such as consumer-level authentication, product registration and in marketing campaigns.

In some embodiments, the phosphors are arranged in a way such that they form a barcode, an image, or both, that the mobile device can detect and read. In some embodiments, the barcode and/or image provides information to the mobile device, that may be used for verification purposes, or other purposes. If that information is a network (intranet, internet, etc.) address, the mobile device can be configured to open a website or file located at the address. In some embodiments, a barcode, using any of the standard 1D or 2D barcode formats, is used, where the barcode contains unencrypted data. In other embodiments, the barcode contains at least some encrypted information, such as using a cryptographic hash. In some embodiments, the barcode contains a mixture of encrypted and unencrypted data. In some embodiments, the unencrypted data is, e.g., a part number, and the encryption algorithm used to decrypt the rest of the data is based on that unencrypted data (for example, the algorithm may be stored in a remote database, and when the part number is sent to the database, the server can respond with the encryption algorithm so that the mobile device can decrypt the entirety of the barcode information.

In some embodiments, the image is simply a random distribution of the phosphor(s) that occurred during the manufacture of the article, coating, etc. That image would be unique to that particular article, and, thus, the image containing the map of where the various phosphor(s) are positioned can be used to authenticate the substrate.

In some embodiments, the barcode or image is a simple yes/no mark, a 2D barcode, and/or an optical key. Various products such as consumer goods and identification cards can be marked with specific phosphors compositions, each providing different optical signatures.

In some embodiments, the barcode or image forms a "secret" message that would only become visible when illuminated with the correct wavelength of light. For example, A code or message such as a password could be printed invisibly to the eye, onto a substrate and when visualized under VCSEL illumination the invisibly printed code or message will appear.

In some embodiments, the barcode or image is on a component of a separate device or system (e.g., the image is on a replacement belt for an automobile engine) and the barcode or image contains information about that component (e.g., a part number, etc.). When the mobile device excites the phosphor(s), and decodes the barcode or image, the mobile device then displays information about the positioning of the component within the separate device or system.

In some embodiments, a rare-earth upconverting phosphor that is incorporated into, e.g., a 3-D printed or injection molded part, or a product label (i.e., hangtag, sewn-in label, sticker, etc.). The phosphor may be activated by the mobile device, for example, activated by an on-board Time-of-Flight (TOF) VCSEL/APD Sensor chip. The TOF-VCSEL sensors may normally be utilized for facial recognition as well as improved image resolution and illumination when capturing images using the integrated CMOS camera. Two unique detection methods for the TOF-VCSEL are utilized when authenticating/verifying the phosphor-containing label: (1) Time-of-Flight for depth and diffuse reflectance measurements which can be used for pixel by pixel RGB analysis; and (2) Structured Light—utilized for random patterns during printing imaged using the optical emission from the phosphors.

Printing techniques have been identified that can provide unique patterns generated by the optical signatures of the upconverting phosphors in the printed inks. Detection methods have also been identified to authenticate those patterns. Ink compositions can be chosen that have the appropriate drying and evaporation rates enabling a periodic structure that exhibits characteristics of self-assembly which can provide a patterned texture when illuminated using the TOF-VCSEL sensor on most mobile devices. Because different morphologies of upconverting phosphors can be arranged randomly in a substrate, generated patterns are equally random. Upconverting phosphor signals are analyzed by the TOF-VCSEL by time domain extraction with the distance to particular points of the product or label are determined on the basis of time-interval measurements. Micron-sized variations that occur naturally during printing give each label slightly random patterns and therefore a unique identity. These graphical codes which exhibit sensitivity to copying and forgery have been extensively explored in the authentication domain. The disclose method may utilize specialized printing processes such as but not limited to multi-deflection inkjet printing to create graphical security elements using specific upconverting phosphor taggants. The combination of the TOF-VCSEL technology and its related pattern recognition algorithms enable significantly simple verification and high authentication performance at the consumer level utilizing commercially available mobile devices that do not require add-on hardware.

An alternative method for authentication of the upconverting phosphors 3D sensing uses structured light. A coded 2D pattern is generated by the TOF-VCSEL illuminating the surface. A CMOS imaging sensor is used to acquire the image. If the surface is nonplanar, the image of the surface from the camera is distorted compared to the coded 2D pattern. The depth information can be extracted from the distortion of the known coded 2D pattern. The coded 2D pattern often consists of randomly distributed dots, which can be realized by the arrangement of the elements of the array.

Steganography is another method that can extend into printed graphical security elements that can be detected using the TOF-VCSEL and upconverting phosphor taggants on current mobile devices. In one embodiment a color cover-image, generated upon excitation of the upconverting phosphor by the TOF-VCSEL, is analyzed based in its hue, saturation and value components. The encoded message is embedded into the hue domain that is imperceptible by human eyes but can be read by the mobile device. For example, one could create a driver's license where the encoded message was the person's actual birthday. When the license was scanned, rather than relying solely on the visible birthday printed on the license, a mobile device could send the user a signal indicating whether that person was (for example) over 18, over 21, etc. In some embodiments, the license would be scanned, and OCR'd, in such a way that, e.g., birthday printed on the license could be compared to the encoded information and verified in that fashion on the smart device as well.

In other embodiments, phosphor(s) may be coated onto a plastic substrate and 'sandwiched' in a laminate similar to standard transaction cards. A mobile device equipped with NIR VCSELs of the appropriate wavelength could be programmed to scan or illuminate the rare earth taggant card, causing a visible emission from the phosphor(s) excited by the NIR VCSEL.

In some embodiments, where the substrate is a lateral flow diagnostic test strip, and the phosphors are lyophilized and attached to the antibodies used on the test strip, the system could be configured such that one characteristic being extracted from the data stream is used to confirm the optical response is authentic, another characteristic is used to identify why diagnosis is being made, and another characteristic is used to determine whether the test result is positive or negative. For example, the system could be configured such that if the rise time and decay time are used to confirm the test strip is authentic, the peak wavelength is used to determine which test is being performed, and the maximum intensity is used to compare versus a threshold to determine if a patient has, e.g., a particular blood-borne illness. The system can be easily adapted to detect a variety of infectious and autoimmune diseases, traumatic injuries such as concussions due to Traumatic Brain Injury (TBI) and other biological processes by utilizing antibody specific biomarkers such as Tau for TBI which can be used as a rapid, 'side-line' test in return-to-play protocols in sports when possible head injuries are suspected. In some embodiments, a separate cartridge (e.g., the housing discussed previously) may be used. The cartridge may be disposable. The cartridge may contain waveguide optics, and, if necessary, a detector for receiving signals from the phosphor(s), label, etc. In some embodiments, the cartridge may also contain microfluidic channels, containing lyophilized phosphors conjugated to various antibodies specific for different biological or chemical targets. Thus, in one embodiment, the combination of the mobile device and cartridge could be used as part of a lateral flow diagnostic device.

An additional aspect of the present disclosure is drawn to at least one non-transitory computer-readable memory that contains instructions, which when executed by at least one processor, perform a method for authentication using phosphors, where the method first involves receiving input from a user. This could be entering in a password, pressing a start button, etc. Based on that input, activating a VCSEL light source configured to emit light that excites the phosphor(s) as described previously. In some embodiments, the instructions also require receiving a signal from the at least one phosphor, extracting data from the received signal, and then comparing the extracted data to an expected response.

Those skilled in the art will recognize, or be able to ascertain using no more than routine experimentation, many equivalents to the specific embodiments of the invention described herein. Such equivalents are intended to be encompassed by the following claims.

What is claimed is:

1. A system, comprising:
    at least one phosphor; and
    a mobile device comprising an IR VCSEL configured to emit at least one wavelength of light to excite the phosphor from within a predetermined maximum distance with sufficient energy such that photons emitted by the phosphor are detectable by a human eye and/or a sensor that is part of the mobile device, the predetermined distance being a distance between the IR VCSEL and the at least one phosphor.

2. The system according to claim 1, wherein the at least one phosphor is on or within a substrate, the substrate comprising a polymeric material, a conductive metal, an insulator, a semiconductor, leather, wood, glass, ceramic, natural or synthetic fiber, or a combination thereof.

3. The system according to claim 1, wherein the at least one phosphor is on or within a toy or a component of a toy, a banknote, a security document, a label, an article of clothing, a fashion accessory, or a diagnostic strip.

4. The system according to claim 3, wherein the at least one phosphor is on or within a toy or a component of a toy, the toy or component of a toy is comprised of a translucent or transparent material, and substantially all of the toy or component of a toy glows with a visible light when the at least one phosphor is excited.

5. The system according to claim 1, wherein the IR VCSEL emits a wavelength with a peak in the range of between 780 and 11000 nm.

6. The system according to claim 1, wherein the predetermined maximum distance is less than about 3 inches.

7. The system according to claim 1, further comprising a lens between the mobile device and the phosphor, configured to concentrate the wavelength of light emitted from the VCSEL down towards the phosphors.

8. The system according to claim 1, further comprising a sensor to detect an optical response from the phosphor.

9. The system according to claim 8, wherein the sensor is a front-facing camera or a rear-facing camera.

10. The system according to claim 8, wherein the sensor is a semiconductor detector.

11. The system according to claim 8, wherein the sensor is configured to detect a signal during and/or after the VCSEL has stopped emitting.

12. The system according to claim 8, wherein the sensor is configured to detect a signal of about the same wavelength as the light emitted from the VCSEL.

13. The system according to claim 8, wherein the system in configured to (a) cause the VCSEL to emit, (b) cause the VCSEL to stop emitting, (c) detect a signal, and (d) repeat steps (a)-(c) a predetermined number of times.

14. The system according to claim 8, wherein the mobile device emits a first wavelength when the detected response matches an expected response, and emits a second wavelength when the detected response does not match the expected response.

15. The system according to claim 1, wherein the at least one phosphor is configured to form a barcode or image, the barcode or image being readable by the mobile device.

16. The system according to claim 15, wherein the barcode or image contains an address, and wherein the mobile device opens a website or file located at the address.

17. The system according to claim 15, wherein the barcode or image is on a component of a separate device or system, wherein the barcode or image contains information about that component, and wherein the mobile device displays information about the positioning of the component within the separate device or system.

18. The system according to claim 1, wherein the mobile device is a smartphone or a wearable device.

19. The system according to claim 1, wherein the at least one phosphor comprises an upconverting phosphor.

20. A method for authentication using phosphors, comprising the steps of:
   initializing an application on a smart device, the application configured to control a VCSEL light source;
   irradiating a substrate comprising at least one phosphor with at least one wavelength of light by activating the VCSEL light source;
   detecting an optical response to the VCSEL irradiation; and
   determining if the optical response matches an expected response.

21. The method according to claim 20, wherein the substrate comprises at least two phosphors having different compositions.

22. The method according to claim 20, wherein determining if the optical response matches an expected response comprises detecting a signal with a sensor and extracting data from the detected signal.

23. The method according to claim 22, wherein the extracted data comprises at least one characteristic selected from the group consisting of brightness, bit depth, luminance, color, color space, intensity/luminosity, hue, tint, saturation, shade, tone, lightness, chromatic signal, and grayscale, or the time dependence of the at least one characteristic.

24. The method according to claim 22, further comprising verifying an optical signature of the at least one phosphor, verifying an identity of a user, or both.

25. The method according to claim 22, further comprising sending at least some of the extracted data and a verification of an optical signature of the at least one phosphor, a verification of an identity of a user, or a combination thereof, to a data storage.

26. At least one non-transitory computer-readable memory carrying instructions to be executed by at least one processor, wherein the instructions are to perform a method for authentication using phosphors, the method comprising:
   receiving input from a user; and
   based on the input from the user, activating a VCSEL light source configured to emit at least one wavelength of light sufficient energy to excite at least one up-converting phosphor positioned at a predetermined maximum distance between the VCSEL light source and the at least one upconverting phosphor.

27. The at least one non-transitory computer-readable memory according to claim 26, wherein the method further comprises:
   receiving a signal from the at least one phosphor;
   extracting data from the received signal; and
   comparing the extracted data to an expected response.

* * * * *